United States Patent
Arokiaraj et al.

(10) Patent No.: US 10,123,090 B2
(45) Date of Patent: Nov. 6, 2018

(54) VISUALLY REPRESENTING SPEECH AND MOTION

(71) Applicant: International Business Machines Corporation, Armonk, NY (US)

(72) Inventors: Francis S. Arokiaraj, Bangalore (IN); Senthil K. Venkatesan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/246,164

(22) Filed: Aug. 24, 2016

(65) Prior Publication Data

US 2018/0063593 A1    Mar. 1, 2018

(51) Int. Cl.
| | |
|---|---|
| H04N 21/488 | (2011.01) |
| H04N 21/435 | (2011.01) |
| H04N 21/431 | (2011.01) |
| H04N 21/439 | (2011.01) |
| H04N 21/44 | (2011.01) |
| H04N 21/81 | (2011.01) |
| H04N 21/845 | (2011.01) |
| G10L 15/02 | (2006.01) |
| G10L 15/18 | (2013.01) |

(52) U.S. Cl.
CPC ......... *H04N 21/4884* (2013.01); *G10L 15/02* (2013.01); *G10L 15/18* (2013.01); *H04N 21/435* (2013.01); *H04N 21/4316* (2013.01); *H04N 21/4394* (2013.01); *H04N 21/44008* (2013.01); *H04N 21/8126* (2013.01); *H04N 21/8456* (2013.01)

(58) Field of Classification Search
CPC ............. H04N 21/4884; H04N 21/435; H04N 21/4394; H04N 21/44008; H04N 21/8126; G10L 15/02; G10L 15/18
See application file for complete search history.

(56) References Cited

U.S. PATENT DOCUMENTS

| | | | |
|---|---|---|---|
| 7,110,946 B2 | 9/2006 | Belenger et al. | |
| 8,185,448 B1 * | 5/2012 | Myslinski | H04N 21/258 705/26.1 |
| 9,307,292 B2 * | 4/2016 | Coudurier | H04N 21/4722 |

(Continued)

FOREIGN PATENT DOCUMENTS

| | | | |
|---|---|---|---|
| WO | 2007002448 A1 | 1/2007 | |
| WO | WO 2007002448 A1 * | 1/2007 | ....... H04L 29/06027 |
| WO | 2007021103 A1 | 2/2007 | |

OTHER PUBLICATIONS https://vimeo.com/75581546.

(Continued)

*Primary Examiner* — Randy A Flynn
(74) *Attorney, Agent, or Firm* — Patterson + Sheridan, LLP (57) ABSTRACT

Systems, methods, and computer program products to perform an operation comprising receiving a video comprising audio data and image data, processing the audio data to identify a first concept in a speech captured in the audio data at a first point in time of the video, identifying a first supplemental image based on the first concept, wherein the first supplemental image visually conveys the concept, and responsive to receiving an indication to play the video, outputting the first supplemental image proximate to the first point in time of the video.

18 Claims, 7 Drawing Sheets

(56) References Cited

U.S. PATENT DOCUMENTS

| | | | | |
|---|---|---|---|---|
| 2002/0078452 A1* | 6/2002 | Devara | ............ | H04N 21/26603 725/44 |
| 2002/0161582 A1* | 10/2002 | Basson | ................... | G10L 21/06 704/260 |
| 2008/0118151 A1* | 5/2008 | Bouguet | ........... | G06F 17/30256 382/181 |
| 2008/0291272 A1* | 11/2008 | Krahnstoever | ......... | G06T 7/246 348/143 |
| 2009/0058860 A1* | 3/2009 | Fong | ..................... | G10L 15/005 345/467 |
| 2009/0086048 A1* | 4/2009 | Jiang | ....................... | G06T 13/40 348/222.1 |
| 2012/0323575 A1* | 12/2012 | Gibbon | .................. | G11B 27/28 704/246 |
| 2013/0179165 A1* | 7/2013 | Holman | ................ | G10L 15/265 704/235 |
| 2014/0178049 A1* | 6/2014 | Kihara | .................... | G10L 15/26 386/280 |
| 2014/0363143 A1* | 12/2014 | Dharssi | ................ | H04N 21/854 386/282 |
| 2015/0208139 A1* | 7/2015 | Homyack | .......... | H04N 21/8405 348/468 |

OTHER PUBLICATIONS http://seewhatimean.co.uk/.
https://photovoice.org/vision-and-mission/.
http://www.ibm.com/smarterplanet/us/en/ibmwatson/developercloud/speech-to-text.html.
http://www.ibm.com/smarterplanet/us/en/ibmwatson/developercloud/visual-recognition.html.
http://www.scirp.org/journal/PaperInformation.aspx?PaperID=8464.
http://www.ijcaer.com/doc/papers/Volume-1/Issue2/HTHMD.pdf.
http://opencv.org/.
http://www.intorobotics.com/9-opencv-tutorials-hand-gesture-detection-recognition/.

\* cited by examiner

VISUALLY REPRESENTING SPEECH AND MOTION

BACKGROUND

The present invention relates to videos, and more specifically, to visually representing speech and motion captured in videos.

Speech recognition software is often used to generate subtitles of speech in videos. However, simply generating subtitles does not capture many elements of the visual and/or audio components of the video. Educational and assistive software packages may be enhanced by including additional elements that are not captured by conventional video processing techniques.

SUMMARY

In one embodiment, a method comprises receiving a video comprising audio data and image data, processing the audio data to identify a first concept in a speech captured in the audio data at a first point in time of the video, identifying a first supplemental image based on the first concept, wherein the first supplemental image visually conveys the concept, and responsive to receiving an indication to play the video, outputting the first supplemental image proximate to the first point in time of the video.

In another embodiment, a system comprises a processor and a memory storing instructions, which when executed by the processor, performs an operation comprising receiving a video comprising audio data and image data, processing the audio data to identify a first concept in a speech captured in the audio data at a first point in time of the video, identifying a first supplemental image based on the first concept, wherein the first supplemental image visually conveys the concept, and responsive to receiving an indication to play the video, outputting the first supplemental image proximate to the first point in time of the video.

In another embodiment, a computer-readable storage medium has computer-readable program code embodied therewith, the computer-readable program code executable by a processor to perform an operation comprising receiving a video comprising audio data and image data, processing the audio data to identify a first concept in a speech captured in the audio data at a first point in time of the video, identifying a first supplemental image based on the first concept, wherein the first supplemental image visually conveys the concept, and responsive to receiving an indication to play the video, outputting the first supplemental image proximate to the first point in time of the video.

DETAILED DESCRIPTION

Embodiments disclosed herein visually represent speech and motion captured in video using images that are associated with the speech and/or motion. Generally, embodiments disclosed herein analyze the image and audio data of the video to identify objects in the video (e.g., a person), the movement of objects, human speech, and any concepts present in the video and/or audio data. Based on the analysis, embodiments disclosed herein may identify images that are relevant to the identified objects, movement, speech, and/or concepts. The identified images are then outputted to the user as companion content to the video (e.g., overlaid on the video, and/or displayed on a companion device). Furthermore, the placement and other attributes of the outputted images may be modified based on the speech and video data (e.g., outputting an image representing an actor in an area of the display corresponding to where the actor was positioned in a video frame).

For example, a news anchor may state that "the president is going on vacation" during a news broadcast, while depicting a video of the beach the president will visit while on vacation. Embodiments disclosed herein may analyze the video data and the audio data of the news broadcast to identify the concepts of "president," "travel," and "beach." Embodiments disclosed herein may then identify images (or other visual content) associated with the identified concepts, and output the images to a user (e.g., on a display the user is watching the video on, or on a separate device including a display, such as a smartphone).

Figure 1A:
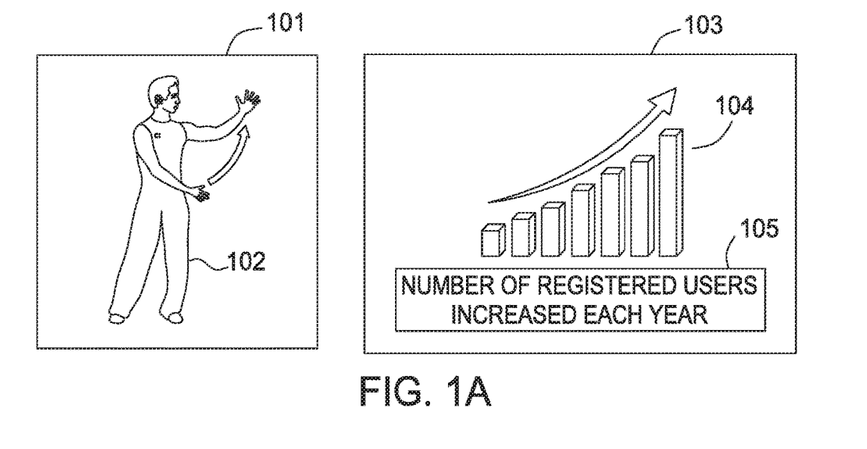
FIGS. 1A-1C illustrate examples of visually representing speech and motion, according to various embodiments.

FIG. 1A illustrates an example of visually representing human speech and motion, according to one embodiment. As shown, FIG. 1A includes a sample frame of video 101, where a person 102 is depicted in the frame of video 101. The frame of video 101 may one of a plurality of frames of video, and may be any type of video. For example, the video including the frame 101 may be a recording of a presentation made by the person 102. For example, the person 102 may be discussing a software product, and may state that the number of users that have registered to use the software product have increased over the last several years, while making an upward gesture with his arms. Embodiments disclosed herein may analyze the video frame 101 (and other frames of the video) and an audio portion of the video associated with the video frame 101 (and other adjacent frames) to determine that the person 102 is talking about the annual improvements in user registration for the software product. As such, embodiments disclosed herein may identify supplemental visual content to enhance the video for users.

For example, as shown, a display device 103 outputs a chart 104 and a subtitle 105. The chart 104 and subtitle 105 may be dynamically selected based on the analysis of the video and audio data of the video including the video frame 101. Therefore, the chart 104 reflects an upward trend, which may be based on the speech of the person 102 and/or the upward hand gesture made by the person 102. Similarly, if the person 102 stated that the number of registered users declined every year, and made a downward hand motion while making the statement, embodiments disclosed herein may output a bar chart depicting the annual decreases. The subtitle 105 is representative of additional supplemental content that may be presented based on the analysis of the video frame 101 and the audio associated with the video. As shown, the subtitle 105 states that the "number of registered users increased each year." In one embodiment, the subtitle 105 is a speech-to-text transcription of the words spoken by the person 102. In another embodiment, the subtitle 105 is dynamically generated based on an analysis of concepts in the speech of the person 102. Although speech is used as a reference example, the particular format of the presentation of oral concepts should not be considered limiting of the disclosure. For example, the concepts may be included in songs or music sung by a person, a music video, and the like.

The supplemental content (e.g., the bar chart 104 and subtitle 105) may be presented to the user in any number of ways. For example, the supplemental content may be overlaid on the frame of video 101 (or adjacent to the frame of video). As another example, the display device 103 is a companion device (such as a smartphone) that outputs the supplemental content as an assistive tool for the user, while not outputting the video associated with the frame of video 101.

Generally, when analyzing video data (e.g., frames of video such as the frame 101), embodiments disclosed herein may use computer vision techniques to identify objects in the video data, and whether these objects are moving. If the objects are moving, the computer vision techniques allow a computer system to determine in which direction the object is moving. The system may then generate features (or attributes) describing the video data, such as metadata describing the person 102, the hand gesture (e.g., a direction of the hand gesture), and the like. Similarly, to process the audio data, the system may use speech-to-text algorithms to generate a text transcription of the speech, and perform natural language processing on the text transcription to generate features of the speech. The features of the speech may specify concepts in the speech. The system may then use the generated features of the audio and video data to select images that have been enhanced with metadata. The images may be selected by matching the features to the metadata of the images. In at least one embodiment, the system may compute a score for a set of images, and return the image (or images) having the highest scores.

Figure 1B:
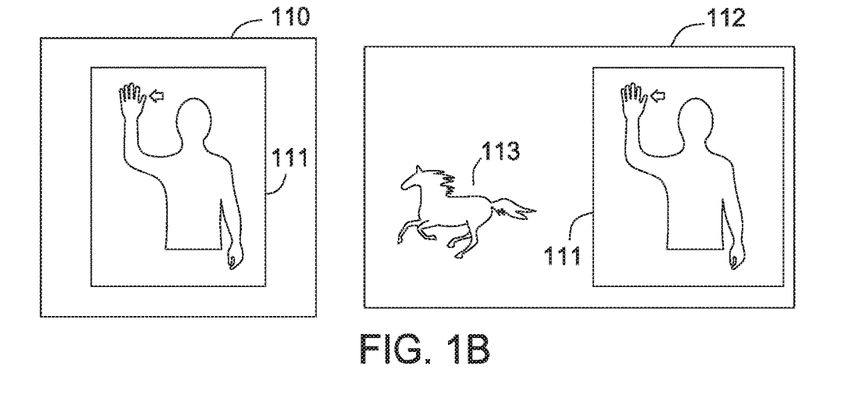

FIG. 1B depicts another example of visually representing human speech and motion, according to one embodiment. As shown, a frame of video 110 depicts a person 111 making a right-to-left gesture with his hand. For example, the person 111 may be a storyteller, and the video frame 110 is part of a video where the person 111 reads a book to children. While making the hand gesture, the person 111 may state that a horse was running from right to left. Embodiments disclosed herein may analyze the video frame 110 (and optionally adjacent video frames) to identify the person 111, the hand gesture, and the direction of movement of the hand gesture. Embodiments disclosed herein may also analyze the audio data and detect the concepts of a horse and movement from right to left in the speech.

As shown, FIG. 1B includes a display 212 which outputs an image 113 of a horse adjacent to the person 111. Therefore, FIG. 1B depicts an embodiment where the companion content (e.g., the image 113) is outputted on the same device that outputs the video including the video frame 110. The image 113 may be selected based on the detected concepts in the audio and video data. As previously indicated, the image 113 may be selected by matching metadata of the image 113 to concepts (or features describing the concepts) generated by analyzing the audio and video data. For example, the image 113 may be enriched with metadata attributes such as "horse" and "right to left." Since these attributes match the features of the audio and video, the image 113 may be selected and returned to the user as supplemental content. Furthermore, the image 113 may be placed on the left portion of the display 212, reflecting the direction the horse is running in.

Figure 1C:
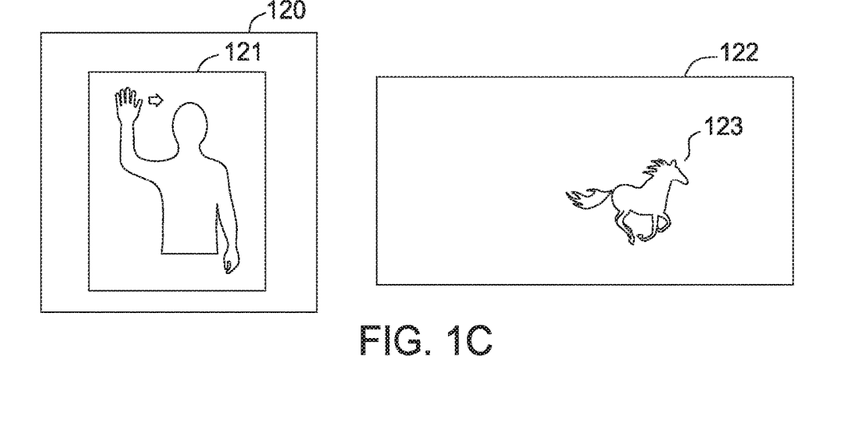

FIG. 1C depicts another example of visually representing human speech and motion, according to one embodiment. As shown, a frame of video 120 depicts a person 121 making a left-to-right gesture with his hand. As in FIG. 1B, the person 121 may be a storyteller, and the video frame 120 is part of a video where the person 121 reads a book to an audience. While making the hand gesture, the person 121 may read from the book and state that a horse was running from left to right. Embodiments disclosed herein may analyze the video frame 120 (and optionally adjacent video frames) to identify the person 121, the hand gesture, and the direction of movement of the hand gesture. Embodiments disclosed herein may also analyze the audio data and detect the concepts of a horse and movement from left to right in the speech.

As shown, FIG. 1C includes a display 122 which outputs an image 123 of a horse without depicting the video including the video frame 120. Therefore, FIG. 1C depicts an embodiment where the companion content (e.g., the image 113) is outputted on a different device than the device that outputs the video including the video frame 120. The image 123 may be selected based on the detected concepts in the audio and video data. As previously indicated, the image 123 may be selected by matching metadata of the image 123 to concepts (or features describing the concepts) generated by analyzing the audio and video data. For example, the image 123 may be enriched with metadata attributes such as "horse" and "left to right." Since these attributes match the features of the audio and video, the image 123 may be selected and returned to the user as supplemental content. Furthermore, the image 123 may be placed on the right portion of the display 122, reflecting the direction the horse is running in.

Figure 2:
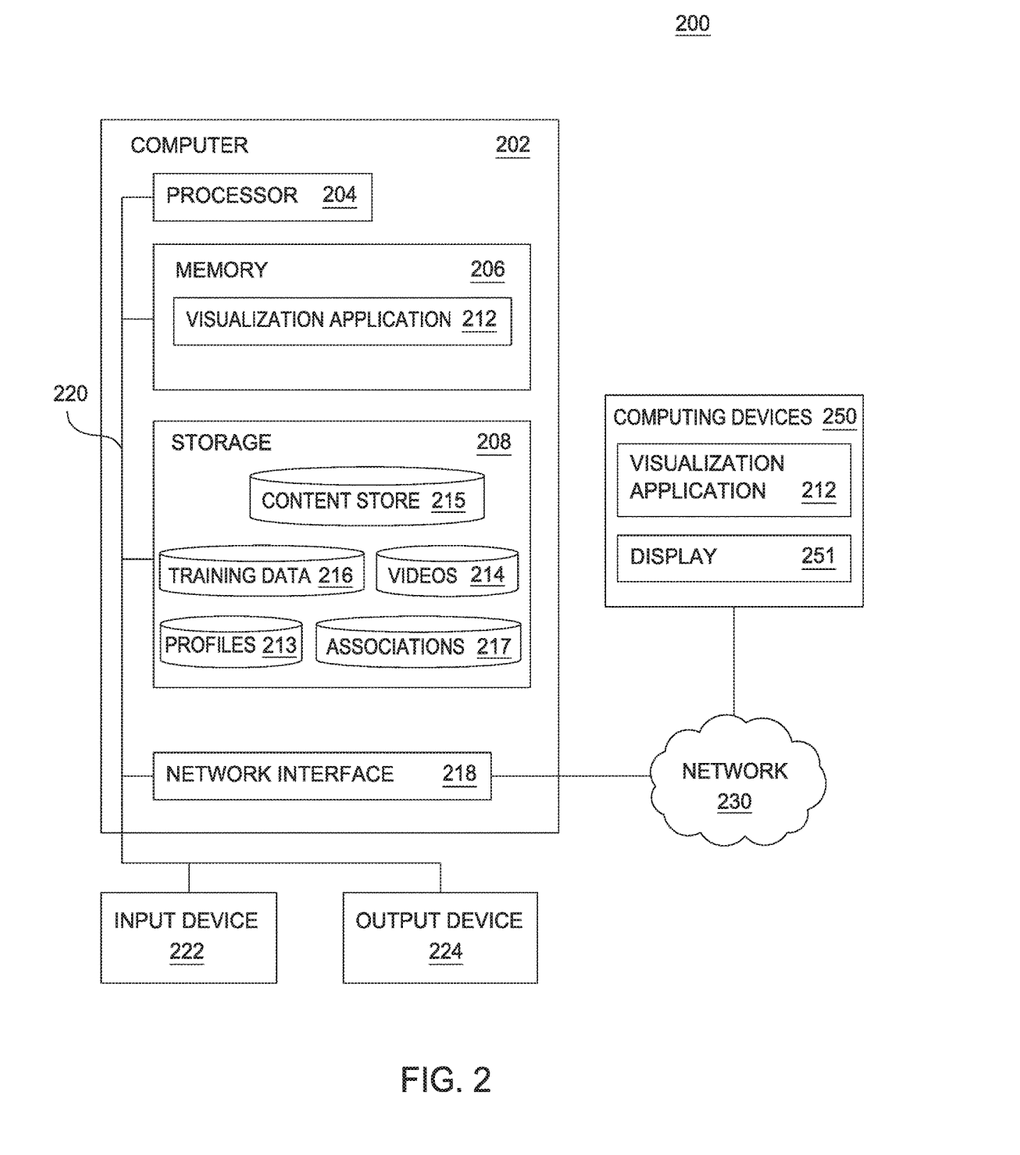
FIG. 2 illustrates an example system which visually represents speech and motion, according to one embodiment.

FIG. 2 illustrates an example system 200 which visually represents human speech and motion, according to one embodiment. The networked system 200 includes a computer 202. The computer 202 may also be connected to other computers via a network 230. In general, the network 230 may be a telecommunications network and/or a wide area network (WAN). In a particular embodiment, the network 230 is the Internet.

The computer 202 generally includes a processor 204 which obtains instructions and data via a bus 220 from a memory 206 and/or a storage 208. The computer 202 may also include one or more network interface devices 218, input devices 222, and output devices 224 connected to the bus 220. The computer 202 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 204 is a programmable logic device that performs instruction, logic, and mathematical processing, and may be representative of one or more CPUs. The network interface device 218 may be any type of network communications device allowing the computer 202 to communicate with other computers via the network 230.

The storage 208 is representative of hard-disk drives, solid state drives, flash memory devices, optical media and the like. Generally, the storage 208 stores application programs and data for use by the computer 202. In addition, the memory 206 and the storage 208 may be considered to include memory physically located elsewhere; for example, on another computer coupled to the computer 202 via the bus 220.

The input device 222 may be any device for providing input to the computer 202. For example, a keyboard and/or a mouse may be used. The input device 222 represents a wide variety of input devices, including keyboards, mice, controllers, and so on. Furthermore, the input device 222 may include a set of buttons, switches or other physical device mechanisms for controlling the computer 202. The output device 224 may include output devices such as monitors, touch screen displays, and so on.

As shown, the memory 206 contains the visualization application 212, which is configured to provide supplemental content which visually represents speech, objects, and motion captured in the image data and audio data of videos. The videos may include videos stored in the videos 214 and live videos (e.g., received from a broadcasting entity). The visualization application 212 includes modules (not pictured) to detect speech, objects, and motion in the audio and video data of videos, such as speech-to-text algorithms, natural language processing (NLP) algorithms, image processing libraries, and computer vision algorithms. For example, the visualization application 212 may use the NLP algorithms to identify concepts spoken by a person depicted in the video, while using the computer vision algorithms to identify objects (such as people) in the image data of the video. The visualization application 212 may then identify images (and other visual objects) in the content store 216 that visually represent the concepts detected by the NLP algorithms and the objects detected by the computer vision algorithms. The visualization application 212 may select images in the content store 216 based on the training data 215 and/or associations defined in the associations 217. The visualization application 212 may then output the identified images on the output device 224 and/or the display 251 of the device 250. For example, when outputting the images on the output device 224 (e.g., a display device), the visualization application 212 may overlay the images on the video (or output the images proximate to the video). As previously indicated, the visualization application 212 may also output the identified images on the display of a companion device, such as the display 251 of a device 250.

As shown, the storage 208 contains a profiles 213, a videos 214, a content store 215, a training data 216, and an associations 217. The profiles 213 include user profile data for each of a plurality of users who consume videos 214, as well as a plurality of people who speak and/or appear in the videos 214. The videos 214 is a data store of videos, which include audio data and image data. In some embodiments, the videos in the videos 214 may have an audio component with minimal video data (e.g., a video which includes an audio recording of a speech, but image data of the speaker presenting the speech is not captured). The videos 214 may be enhanced with metadata generated by the visualization application 212 (e.g., a tagging the video with metadata describing who is depicted in the video). The content store 215 includes images, graphical interchange format (GIF) files, videos, and other visual content that represent object, movement of objects, and/or concepts in speech captured in the videos 214. The items of content stored in the content store 215 may have associated metadata describing each item of content (e.g., an image of a cat may include metadata indicating that a cat is depicted in the image, the type of cat, and the like).

The training data 216 includes machine learning (ML) models used to identify images (or other visual content) in the content store 215. The training data 216 may be generated during a training phase for the visualization application 212, where content in the content store 215 is identified based on training videos in the videos 214. The visualization application 212 may subsequently process videos in a runtime environment (e.g., on request from a user, or during a live broadcast of a video). The visualization application 212 may then detect objects and movement in the image data of the videos, and identify concepts in the audio data of the videos. The visualization application 212 may leverage the training data 216 to select appropriate images in the content store 215 to represent the corresponding objects, movement, and speech. Over time, the training data 216 may be updated to improve the accuracy of the visualization application 212 in identifying images. The associations 217 stores defined associations between objects, movement, and concepts in videos and items of content in the content store 215. For example, an association 217 may map the concept of "dogs" to an image depicting a dog in the content store 215. Therefore, the visualization application 212 may leverage the training data 216 and the associations 217 when selecting content in the content store 215 to visually represent speech, objects, and movement in videos stored in the videos 214.

As shown, the system 200 includes one or more computing devices 250 which execute an instance of the visualization application 212. The computing devices 250 are representative of any type of computing device, such as a laptop, desktop, smartphone, or tablet. The computing devices 250 are companion devices in that the instance of the visualization application 212 on the computer 202 may transmit images from the content store 215 to the instance of the visualization application 212 on the computing devices 250. The instance of the visualization application 212 on the computing devices 250 may then output the received images on the display 251, while the user watches a video on a different display device (e.g., the computer 202, a television, and the like).

Figure 3:
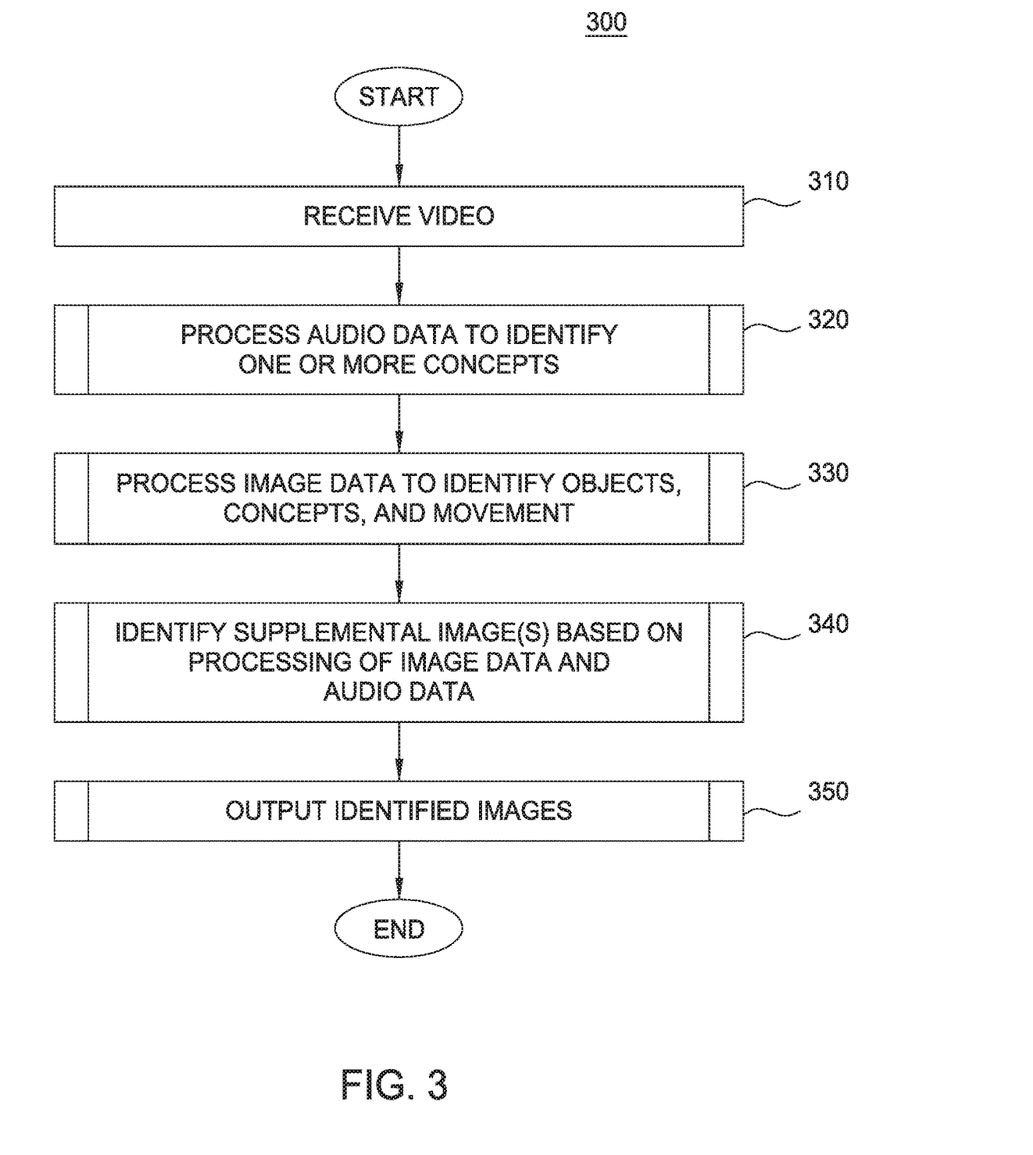
FIG. 3 is a flow chart illustrating an example method to visually represent speech and motion, according to one embodiment.

FIG. 3 is a flow chart illustrating an example method 300 to visually represent human speech and motion, according to one embodiment. As shown, the method 300 begins at block 310, where the visualization application 212 receives a video which includes audio data and video (e.g., image) data. The video may be a live video, or may be received from the videos 214. At block 320, described in greater detail with reference to FIG. 4, the visualization application 212 may process the audio data of the video to identify one or more concepts in speech recorded in the audio data. For example, if a professor is giving a lecture on object oriented programming, the visualization application 212 may identify the concepts of "classes" and "inheritance" during the first minute of the lecture. At block 330, described in greater detail with reference to FIG. 5, the visualization application 212 may process the image data of the video to identify objects in the video, movement of objects in the video, and any other concepts in the video. For example, the video portion of the object oriented programming lecture may depict the lecturer. The visualization application 212 may identify the lecturer in the image data and movements made by the lecturer. At block 340, described in greater detail with reference to FIG. 6, the visualization application 212 may identify one or more supplemental images (or other visual content) in the content store 215 based on the processing of the image data and audio data at blocks 320, 330. For example, the image may depict a tree where the child nodes inherit attributes of ancestor nodes in the tree, serving as a visual representation of inheritance in object oriented programming.

At block 350, described in greater detail with reference to FIG. 7, the visualization application 212 may output the identified images to the user. Generally, the visualization application 212 outputs supplemental images in conjunction with the relevant portion of video. Therefore, the visualization application 212 may time the outputting of supplemental images based on a current playback progress of the video. The visualization application 212 may associate each identified supplemental image with a timestamp (or range of times) in the video. During playback of the video, the visualization application 212 may output the supplemental image at the time associated with each supplemental image. Therefore, if a weather forecaster makes a hand gesture to indicate forthcoming cold weather at the ten minute mark of a news broadcast, the visualization application 212 may identify an image of the Arctic winter as visually representing the hand gesture, and output the image of the Arctic at the ten minute mark during playback of the video. In embodiments where the news broadcast is live, the visualization application 212 may output the image of the Arctic without delay.

Figure 4:
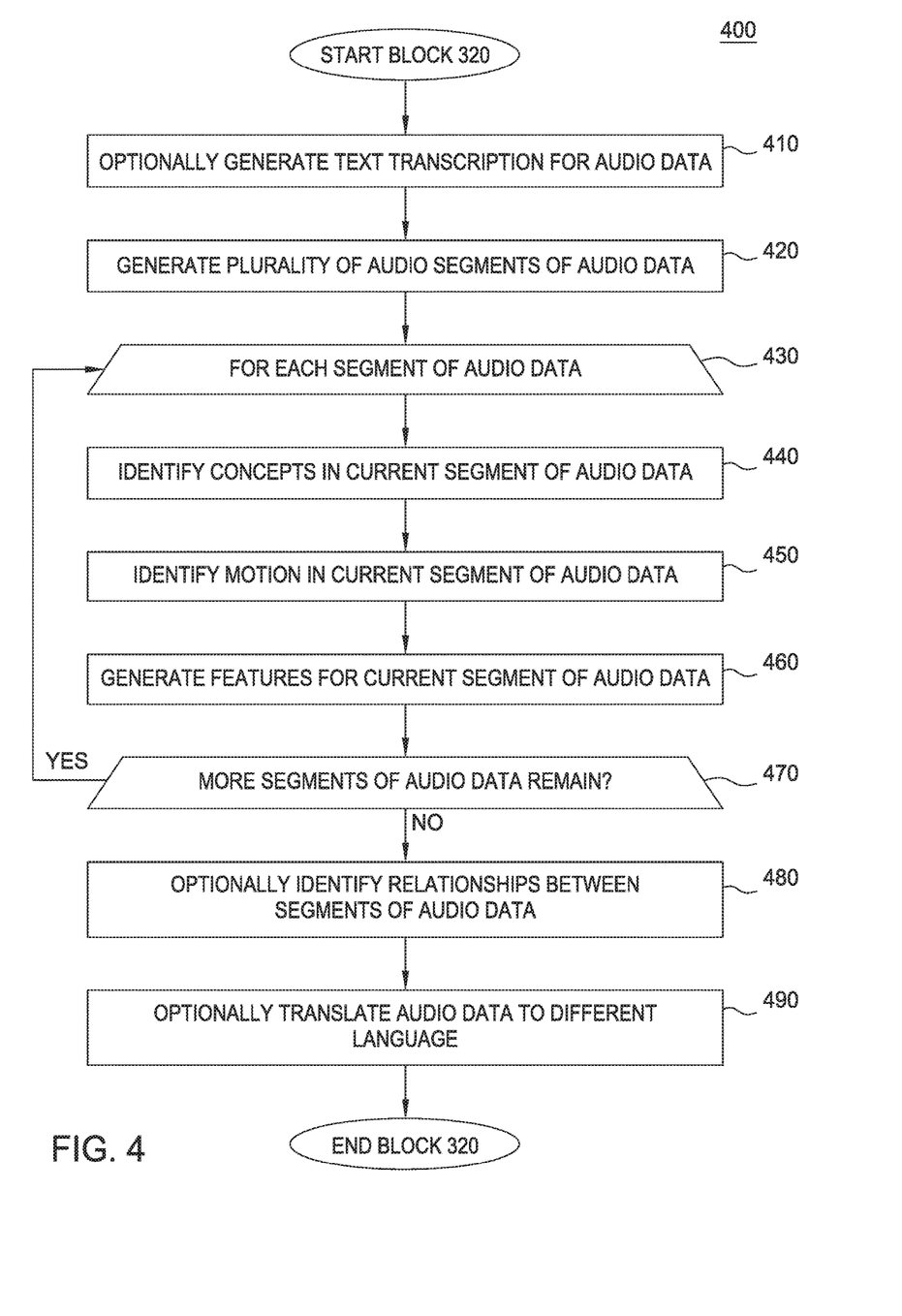
FIG. 4 is a flow chart illustrating an example method to process audio data, according to one embodiment.

FIG. 4 is a flow chart illustrating an example method 400 corresponding to block 320 to process audio data, according to one embodiment. As shown, the method 400 begins at block 410, where the visualization application 212 may optionally generate a text transcription of the speech in the audio data of the video received at block 310 using a speech-to-text algorithm. At block 420, the visualization application 212 generates a plurality of audio segments for the audio data of the video received at block 310. The visualization application 212 may generate the audio segments based on any factor, such as time, subject matter of speech in the audio data, and the like. For example, the visualization application 212 may divide the audio data into a plurality of 10-second segments. Therefore, the audio portion of a 30 minute news broadcast may be divided into 180 audio segments. At block 430, the visualization application 212 executes a loop including blocks 440-470 for each segment of audio data generated at block 410. At block 440, the visualization application 212 may identify concepts in the current segment of audio data. For example, the visualization application 212 may detect terms in the audio data and/or text transcriptions, such as a weather forecaster mentioning a "heat wave" during the weather portion of the news broadcast. Similarly, the visualization application 212 may identify concepts using one or more NLP algorithms applied to the audio data and/or text data. Furthermore, the visualization application 212 may identify additional attributes of the current segment of audio data and/or concepts identified in the current segment of audio data. For example, the visualization application 212 may identify speakers in the current segment of audio data and retrieve biographical information for each speaker. The visualization application 212 may then tag the video (and/or the segments of audio data) with an indication of which people spoke during each segment of audio data. Doing so allows the visualization application 212 to identify specific items based on more generic terms. For example, the visualization application 212 may identify the president of a country and (which country they are president of), based on an analysis of an image of the president, even though a news broadcaster may simply mention "the president" without speaking the president's name.

At block 450, the visualization application 212 may identify concepts indicating movement in the current segment of audio data. For example, the visualization application 212 may identify movement as a concept when the weather forecasters mention the path of a storm system moving west to east. At block 460, the visualization application 212 generates features describing the current segment of audio data based on blocks 430-450. For example, the features may specify persons who speak in the audio data, directionality of motion, concepts present in the speech, and the like. The visualization application 212 may then store the features as metadata of the corresponding video in the videos 214. At block 470, the visualization application 212 determines whether more segments of audio data remain for the current video. If more segments of audio data remain, the method returns to block 430. If no more segments of audio data remain, the method proceeds to block 480, where the visualization application 212 optionally identifies relationships between two or more segments of audio data. For example, if the weather forecaster presents a "sneak peek" at the weather before the news program goes to commercial, while presenting the entire weather forecast at a later time, the visualization application 212 may associate the sneak peek with the entire weather forecast. At block 490, the visualization application 212 may optionally translate the audio data (and/or the text transcription) to a different language. For example, a user may specify a preferred language in their user profile 213. The visualization application 212 may then convert the audio data and/or text transcription to the user's preferred language.

Figure 5:
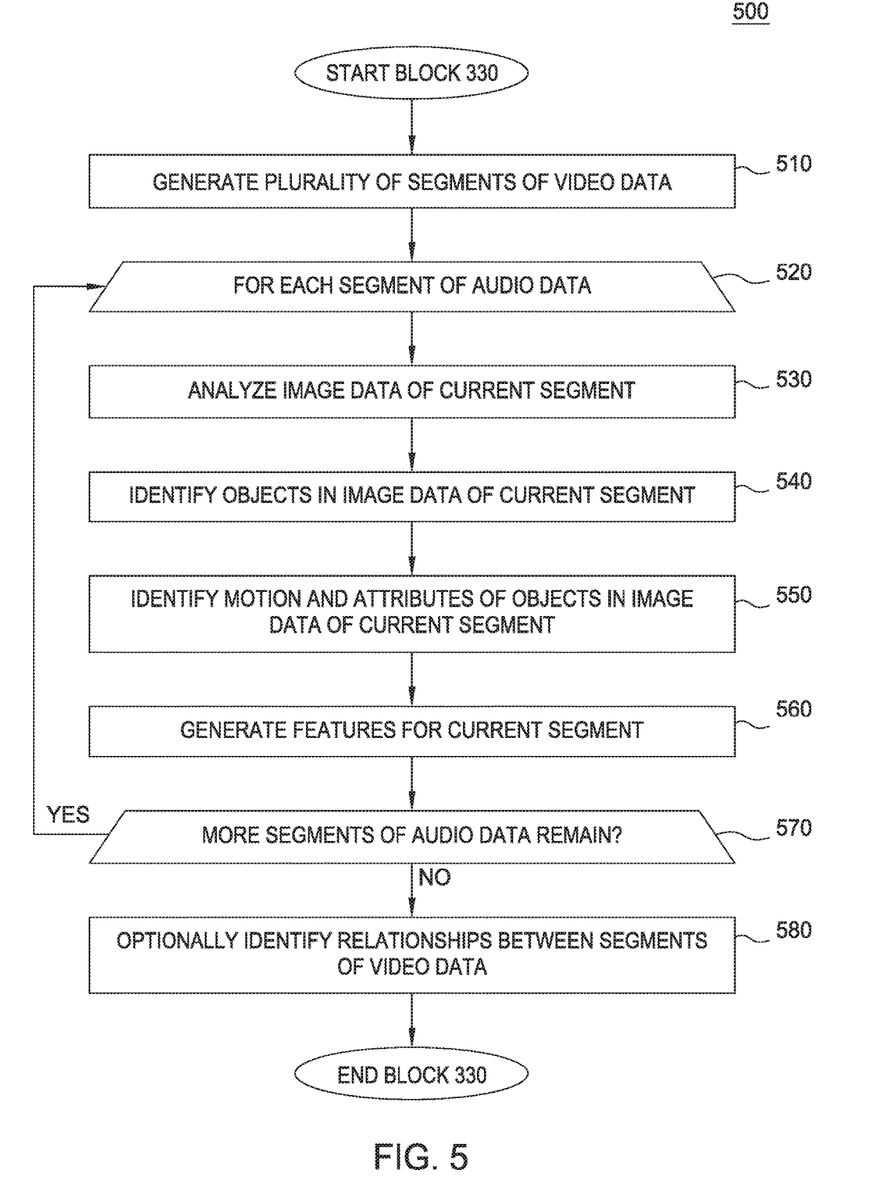
FIG. 5 is a flow chart illustrating an example method to process video data, according to one embodiment.

FIG. 5 is a flow chart illustrating an example method 500 corresponding to block 330 to process video data, according to one embodiment. As shown, the method 500 begins at block 510, where the visualization application 212 generates a plurality of video segments for the video data of the video received at block 310. The visualization application 212 may generate the video segments based on any factor, such as time, identifying related objects in the video data, identifying common objects in the video data, and the like. Generally, each video segment includes one or more video frames (e.g., images) that make up the video. In at least one embodiment, the number of video segments generated at block 510 equals the number of audio segments generated at block 410. Doing so allows the visualization application 212 to associate audio and video features of the video (e.g., based on timestamps associated with each segment of audio and video). At block 520, the visualization application 212 executes a loop including blocks 530-570 for each segment of video data generated at block 510.

At block 530, the visualization application 212 analyzes the image data of the current segment of video data. For example, the visualization application 212 may apply computer vision algorithms, facial recognition algorithms, and other image analysis routines. At block 540, the visualization application 212 may identify one or more objects in the current segment of video data. For example, the visualization application 212 may identify two anchors of the news program based on facial recognition algorithms and a map of the United States based on a computer vision algorithm. At block 550, the visualization application 212 may identify motion and/or other attributes of the objects in the current segment of video data. For example, the visualization application 212 may identify a hand gesture made by the news anchor (and a direction of the hand gesture), determine that the weather forecaster walked from left to right in front of a map of the United States, and the like. In at least one embodiment, the visualization application 212 detects movement of objects by comparing the placement of the objects (and/or the presence of the object) in adjacent frames of video.

At block 570, the visualization application 212 generates features describing the current segment of video data. The features include any type of metadata attribute describing an object in the video data and/or the video data itself. The features may be stored as metadata of the videos in the videos 214. At block 570, the visualization application 212 determines whether additional segments of video data remain. If more segments of video data remain, the method returns to block 520. Otherwise, the method proceeds to block 580, where the visualization application 212 optionally identifies relationships between segments of video data. The relationships may be based on common people present in multiple video segments, common objects present in multiple video segments, and the like. The visualization application 212 may then store the relationships as metadata of the videos in the videos 214.

Figure 6:
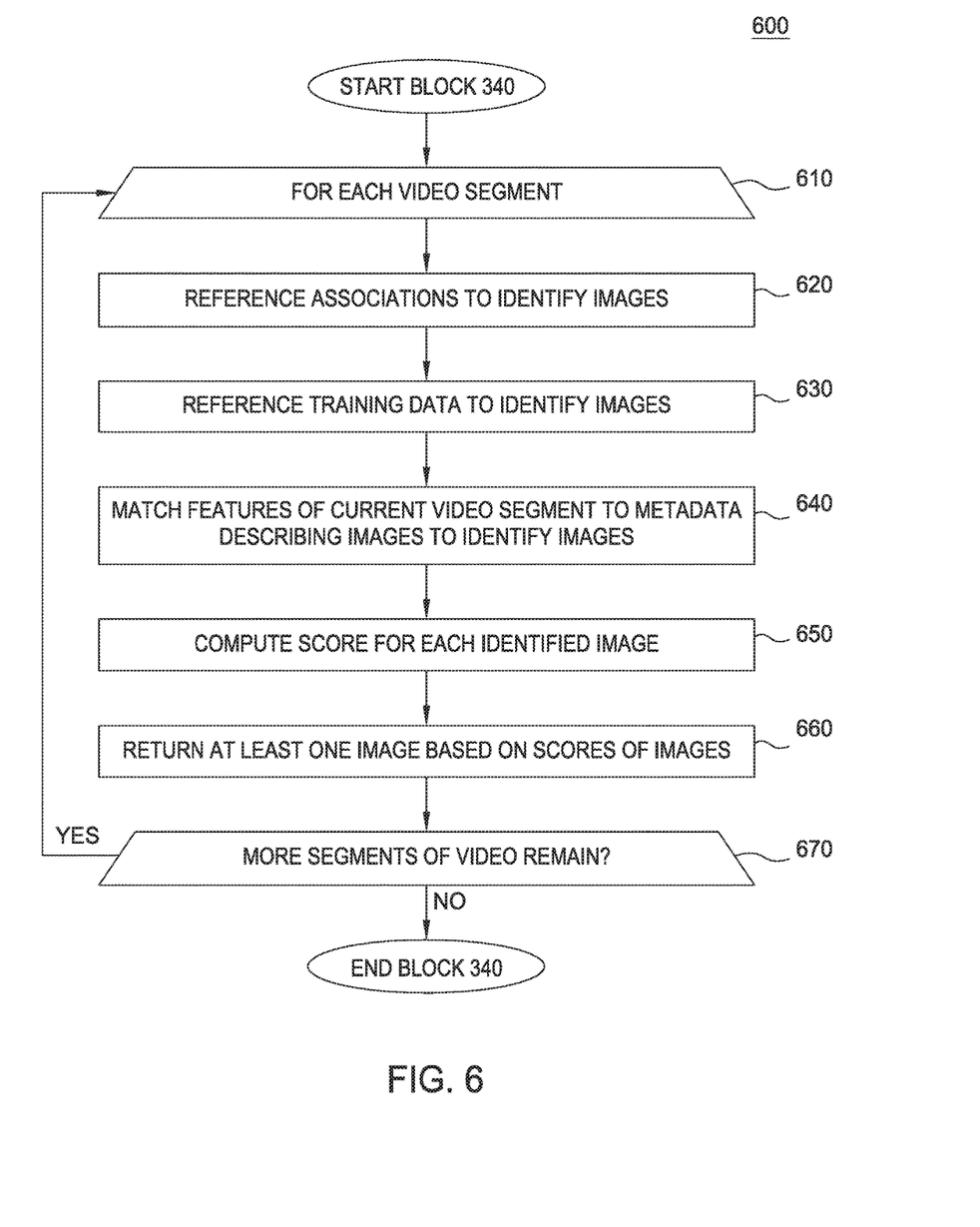
FIG. 6 is a flow chart illustrating an example method to identify images, according to one embodiment.

FIG. 6 is a flow chart illustrating an example method 600 corresponding to block 340 to identify images, according to one embodiment. As shown, the method 600 begins at block 610, where the visualization application 212 executes a loop for each video segment (e.g., the audio segments generated at block 410 and the matching video segments generated at block 510). At block 620, the visualization application 212 references the associations 217 using the features of the current video segment (which includes the features generated at blocks 460 and 560) to identify one or more images in the content store 215. For example, a first feature of the current video segment may indicate that a speaker was discussing biology. The visualization application 212 may then reference the associations 217 to determine whether any associations exist between the concept of biology and images in the content store 215. If such an association exists, the visualization application 212 may identify the corresponding images in the content store 215.

At block 630, the visualization application 212 may reference the machine learning models in the training data 216 using the features of the current video segment. Doing so may return one or more images from the content store 215 as visually representing the current segment of video. At block 640, the visualization application 212 may match the features of the current video segment to metadata describing the images in the content store 215 to identify one or more images. For example, if an audio feature of the current video segment indicates a speaker was discussing a decline in readership of a magazine, the visualization application 212 may search the content store 215 for images that have metadata tags that specify "magazines" and "decline." At block 650, the visualization application 212 may compute a score for each image identified at blocks 620-640. The score may generally reflect how well the identified image visually represents the objects, motion, and concepts in speech of the current video segment. For example, if a storyteller is reading a book about the sea, an image of the desert would receive a lower score than an image of a boat on the water.

At block 660, the visualization application 212 returns at least one image based on the scores computed for each image at block 650. In at least one embodiment, the visualization application 212 ranks each image based on the computed scores. The visualization application 212 may then return the highest scoring image (or predefined number of images) based on the rankings. Therefore, the visualization application 212 may return the image of the boat, but not the image of the desert. At block 670, the visualization application 212 determines whether more segments of video remain. If more segments of video remain, the visualization application 212 returns to block 610. Otherwise, the method 600 ends.

Figure 7:
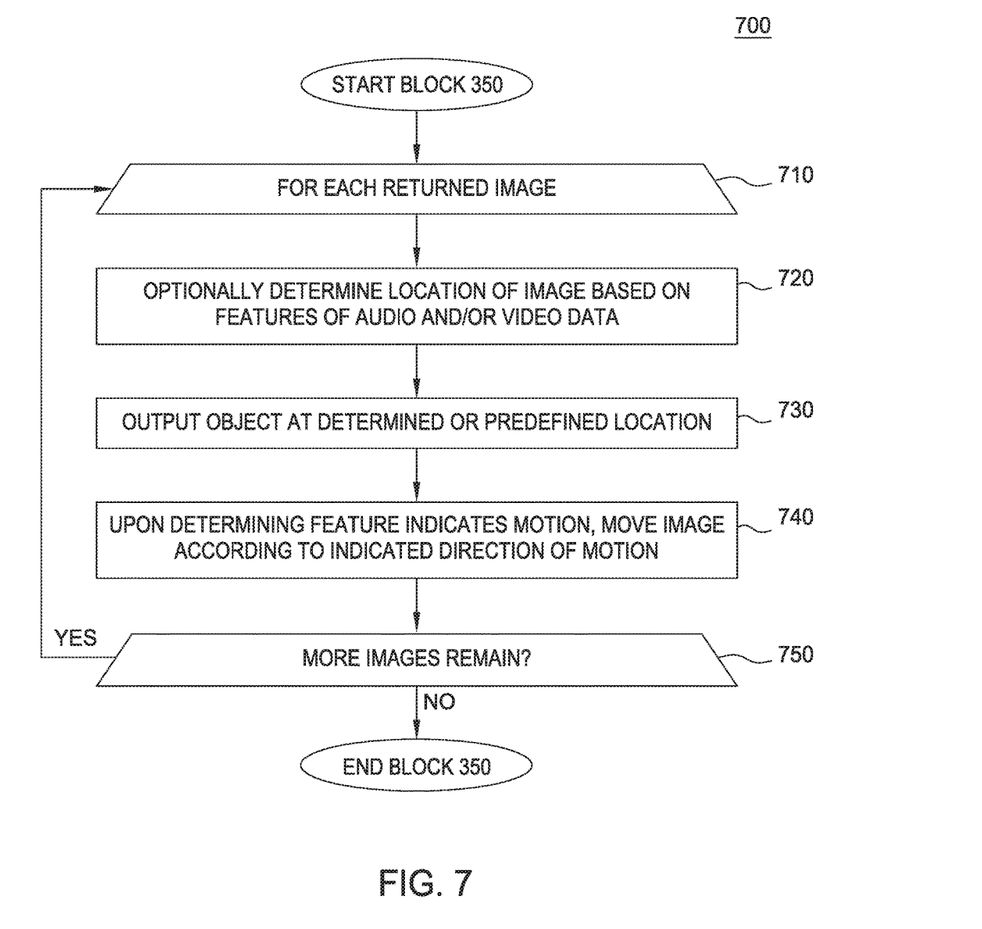
FIG. 7 is a flow chart illustrating an example method to output an identified image based on detected concepts, according to one embodiment.

FIG. 7 is a flow chart illustrating an example method 700 corresponding to block 350 to output identified images, according to one embodiment. As shown, the method 700 begins at block 710, where the visualization application 212 executes a loop including blocks 720-740 for each image returned at block 660. At block 720, the visualization application 212 optionally determines a location for outputting the current image based on the features of audio and/or video data. For example, if a public figure is seated on the left side of a video frame, the visualization application 212 may output an image which visually represents the public figure on the left side of a display device. At block 730, the visualization application 212 outputs the current image. The visualization application 212 may output the image at the location determined at block 720, or a predefined location (in the event a location is not determined at block 720). At block 740, the visualization application 212 may move the image when displayed, upon determining a feature of the audio and/or video indicates motion. For example, if a sports commentator states that a football team is driving from left to right, the visualization application 212 may move an image of a football from left to right when outputted on a display. At block 750, the visualization application 212 determines whether more images remain. If more images remain, the visualization application 212 returns to block 710. Otherwise, the method 700 ends.

Advantageously, embodiments disclosed herein provide techniques to visually represent speech, motion, and other concepts captured in the audio and/or video data of a video. Doing so enhances educational tools, accessibility tools, assistive tools, and the like.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the foregoing, reference is made to embodiments presented in this disclosure. However, the scope of the present disclosure is not limited to specific described embodiments. Instead, any combination of the recited features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. For example, the visualization application 212 could execute on a computing system in the cloud. In such a case, the visualization application 212 may store images that visually represent speech and motion captured in videos at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method, comprising:
receiving a video comprising audio data and image data;
processing a text transcription of the audio data using a natural language processing (NLP) algorithm to identify a first concept in a speech captured in the audio data at a first point in time of the video;
processing the image data to detect an object depicted in the image data and motion of the object at a second point in time in the video;
generating, based on a machine learning (ML) model, a plurality of features for the video, wherein the features comprise audio features and video features, wherein the features describe the identified first concept, the detected object, and the detected motion of the object;
determining, based on the generated plurality of features, that the object in the image data is associated with the first concept;
identifying a first supplemental image based on the generated plurality of features, the ML model, and a score computed for the first supplemental image, wherein the first supplemental image visually conveys the first concept; and
responsive to receiving an indication to play the video, outputting the video on a display of a first device and the first supplemental image on a display of a second device proximate to the first point in time of the video.

2. The method of claim 1, further comprising:
identifying a second supplemental image based on the plurality of features and the ML model, wherein the second supplemental image conveys the motion of the object; and
while playing the video on the display of the first device, outputting the second supplemental image on the display of the second device proximate to the second point in time of the video.

3. The method of claim 2, wherein processing the image data comprises:
generating a plurality of segments of the image data of the video, wherein each of the plurality of segments of the image data comprise at least one frame of video;
identifying the object in a first segment of the plurality of segments using at least one image processing algorithm applied to the at least one frame of video of the first segment;
identifying the object in a second segment of the plurality of segments using the at least one image processing algorithm applied to the at least one frame of video of the second segment; and
comparing a position of the object in the at least one frame of the first and second segments to detect the motion of the object.

4. The method of claim 3, further comprising:
identifying a direction of the motion of the object; and
while outputting the second supplemental image on the display of the second device, moving the second supplemental image on the display of the second device to track the direction of the motion of the object.

5. The method of claim 1, wherein processing the audio data comprises:
generating the text transcription of the speech in captured in the audio data of the video; and
detecting the first concept in the text transcription of the speech using the NLP algorithm.

6. The method of claim 1, wherein identifying the first supplemental image further comprises:
identifying a plurality of supplemental images by matching the plurality of features to a respective metadata attribute of each of the supplemental images, wherein the ML models are generated using training data;
computing a score for each of the plurality of supplemental images, wherein each score indicates a degree to which each supplemental image visually conveys the first concept;
ranking each of the plurality of supplemental images based on the respective scores; and
returning the highest ranking image as the first supplemental image.

7. A computer program product, comprising:
a non-transitory computer-readable storage medium having computer readable program code embodied therewith, the computer readable program code executable by a processor to perform an operation comprising:
receiving a video comprising audio data and image data;
processing a text transcription of the audio data using a natural language processing (NLP) algorithm to identify a first concept in a speech captured in the audio data at a first point in time of the video;
processing the image data to detect an object depicted in the image data and motion of the object at a second point in time in the video;
generating, based on a machine learning (ML) model, a plurality of features for the video, wherein the features comprise audio features and video features, wherein the features describe the identified first concept, the detected object, and the detected motion of the object;

determining, based on the generated plurality of features, that the object in the image data is associated with the first concept;

identifying a first supplemental image based on the generated plurality of features, the ML model, and a score computed for the first supplemental image, wherein the first supplemental image visually conveys the first concept; and responsive to receiving an indication to play the video, outputting the video on a display of a first device and the first supplemental image on a display of a second device proximate to the first point in time of the video.

8. The computer program product of claim 7, the operation further comprising:

identifying a second supplemental image based on the plurality of features and the ML model, wherein the second supplemental image conveys the motion of the object; and while playing the video on the display of the first device, outputting the second supplemental image on the display of the second device proximate to the second point in time of the video.

9. The computer program product of claim 8, wherein processing the image data comprises:

generating a plurality of segments of the image data of the video, wherein each of the plurality of segments of the image data comprise at least one frame of video;

identifying the object in a first segment of the plurality of segments using at least one image processing algorithm applied to the at least one frame of video of the first segment;

identifying the object in a second segment of the plurality of segments using the at least one image processing algorithm applied to the at least one frame of video of the second segment; and comparing a position of the object in the at least one frame of the first and second segments to detect the motion of the object.

10. The computer program product of claim 9, the operation further comprising:

identifying a direction of the motion of the object; and while outputting the second supplemental image on the display of the second device, moving the second supplemental image on the display of the second device to track the direction of the motion of the object.

11. The computer program product of claim 7, wherein processing the audio data comprises:

generating the text transcription of the speech in captured in the audio data of the video; and detecting the first concept in the text transcription of the speech using the NLP algorithm.

12. The computer program product of claim 7, wherein identifying the first supplemental image further comprises:

identifying a plurality of supplemental images by matching the plurality of features to a respective metadata attribute of each of the supplemental images, wherein the ML models are generated using training data;

computing a score for each of the plurality of supplemental images, wherein each score indicates a degree to which each supplemental image visually conveys the first concept;

ranking each of the plurality of supplemental images based on the respective scores; and returning the highest ranking image as the first supplemental image.

13. A system, comprising:

a processor; and a memory storing one or more instructions which, when executed by the processor, performs an operation comprising:

receiving a video comprising audio data and image data;

processing a text transcription of the audio data using a natural language processing (NLP) algorithm to identify a first concept in a speech captured in the audio data at a first point in time of the video;

processing the image data to detect an object depicted in the image data and motion of the object at a second point in time in the video;

generating, based on a machine learning (ML) model, a plurality of features for the video, wherein the features comprise audio features and video features, wherein the features describe the identified first concept, the detected object, and the detected motion of the object;

determining, based on the generated plurality of features, that the object in the image data is associated with the first concept;

identifying a first supplemental image based on the generated plurality of features, the ML model, and a score computed for the first supplemental image, wherein the first supplemental image visually conveys the first concept; and responsive to receiving an indication to play the video, outputting the video on a display of a first device and the first supplemental image on a display of a second device proximate to the first point in time of the video.

14. The system of claim 13, the operation further comprising:

identifying a second supplemental image based on the plurality of features and the ML model, wherein the second supplemental image conveys the motion of the object; and while playing the video on the display of the first device, outputting the second supplemental image on the display of the second device proximate to the second point in time of the video.

15. The system of claim 13, wherein processing the image data comprises:

generating a plurality of segments of the image data of the video, wherein each of the plurality of segments of the image data comprise at least one frame of video;

identifying the object in a first segment of the plurality of segments using at least one image processing algorithm applied to the at least one frame of video of the first segment;

identifying the object in a second segment of the plurality of segments using the at least one image processing algorithm applied to the at least one frame of video of the second segment; and comparing a position of the object in the at least one frame of the first and second segments to detect the motion of the object.

16. The system of claim 13, the operation further comprising:

identifying a direction of the motion of the object; and while outputting the second supplemental image on the display of the second device, moving the second supplemental image on the display of the second device to track the direction of the motion of the object.

17. The system of claim 13, wherein processing the audio data comprises:
generating the text transcription of the speech in captured in the audio data of the video; and
detecting the first concept in the text transcription of the speech using the NLP algorithm.

18. The system of claim 13, wherein identifying the first supplemental image further comprises:
identifying a plurality of supplemental images by matching the plurality of features to a respective metadata attribute of each of the supplemental images, wherein the ML models are generated using training data;
computing a score for each of the plurality of supplemental images, wherein each score indicates a degree to which each supplemental image visually conveys the first concept;
ranking each of the plurality of supplemental images based on the respective scores; and
returning the highest ranking image as the first supplemental image.

* * * * *